(No Model.)

H. GARDNER.
MOTION TRANSMITTER.

No. 294,608.  Patented Mar. 4, 1884.

WITNESSES:
Hrs Beyer
C. Sedgwick

INVENTOR:
H. Gardner
BY Munn & Co.
ATTORNEYS.

UNITED STATES PATENT OFFICE.

HENRY GARDNER, OF BORDENTOWN, NEW JERSEY.

MOTION-TRANSMITTER.

SPECIFICATION forming part of Letters Patent No. 294,608, dated March 4, 1884.

Application filed December 5, 1883. (No model.)

*To all whom it may concern:*

Be it known that I, HENRY GARDNER, of Bordentown, in the county of Burlington and State of New Jersey, have invented a new and Improved Motion-Transmitter, of which the following is a full, clear, and exact description.

The object of this invention is to provide a motion-transmitter for imparting motion to sewing-machines or other small machines which require frequent startings and stoppings. The transmitter is designed to be controlled by the foot of the operator, and makes a simple, quick-acting, reliable, and cheap device for its purpose, all as hereinafter fully described, and pointed out in the claims.

Reference is to be had to the accompanying drawings, forming a part of this specification, in which similar letters of reference indicate corresponding parts in both the figures.

Figure 1:
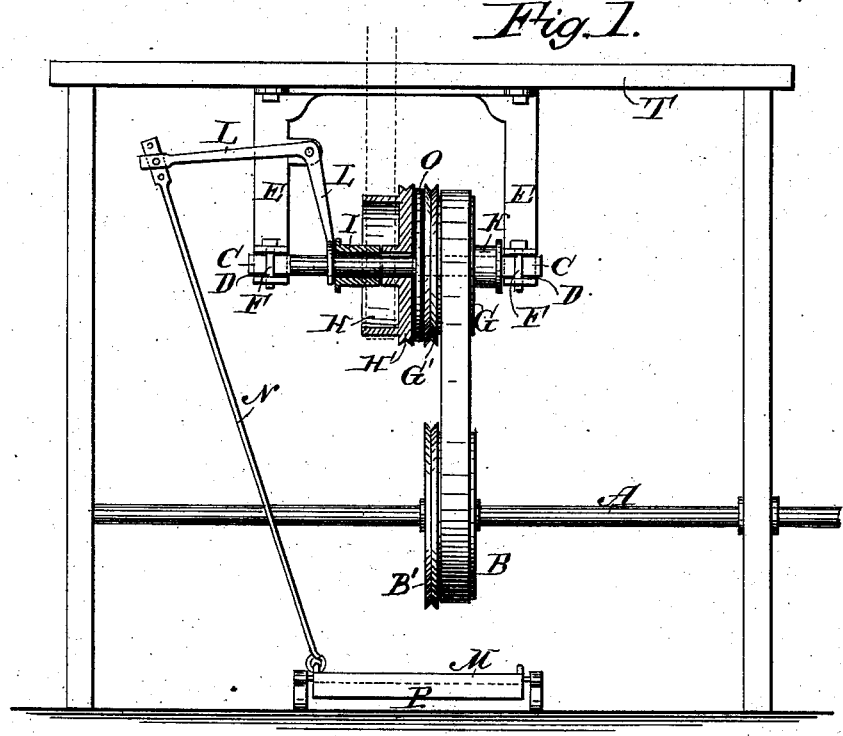
Figure 2:
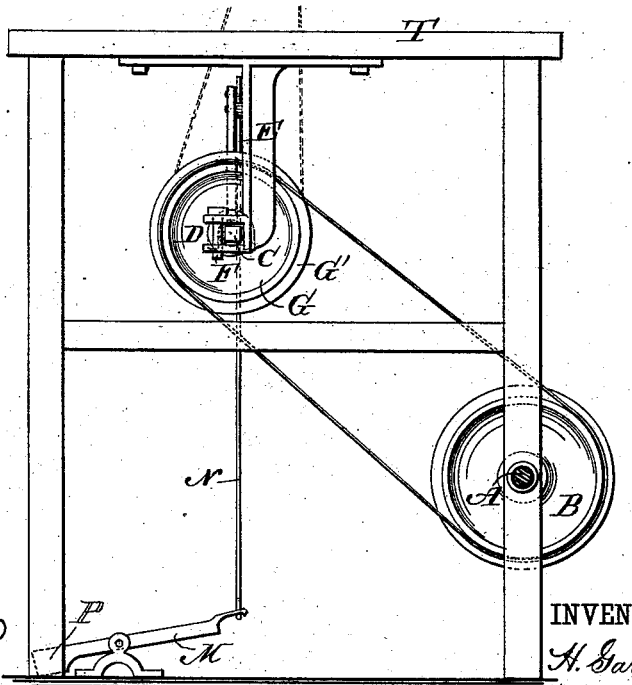

Figure 1 shows the device in front elevation, with some parts in section; and Fig. 2 is a side elevation of the same.

The letter A indicates a line of shafting, which carries a band-wheel or drive-pulley, B, and is turned by a steam-engine or other connected power. Above this shaft A is held a stationary shaft, C, in hangers E E, secured to the under side of the table T. The shaft C is round in section where it receives its pulleys, and has squared ends that enter angular or three-sided sockets D D at the bottom of the hangers E. The shaft is secured in the hanger-sockets by bolts F F, one for each end. This form of hanger, with square socket combined with a square-ended shaft, possesses the advantage of great simplicity. All that is required to remove the shaft for changing the pulleys for different speeds is to take out the bolts F. The shaft C carries a pulley, G, which is revolved freely and continuously upon it by a band or belt passing over the drive-pulley B. On the shaft C is placed another pulley, H, which drives the sewing or other machine fixed on table T by a flat belt, (shown in dotted lines,) or by a round belt or cord placed in the grooved part H' of the pulley H, which is thus adapted for driving with either kind of belt. If this pulley H rotates, the machine above will be driven, and to rotate or stop the machine at will I arrange on the shaft C a loose sleeve or washer, I, to be pushed along the shaft by the elbow-lever L, pivoted to a hanger, E, as shown, and worked by the treadle M and connecting-rod N. A depression of the inner end of the treadle presses the sleeve I against the hub of the wheel H and moves said wheel toward the wheel G. Between the opposing sides of the wheels G and H a disk, O, of paper, leather, or other suitable material, is placed on the shaft C. As the wheel H is moved toward the wheel G by the lever L, it squeezes this disk O between its own side and the side of the wheel G, causing friction, which immediately starts drive-pulley H into motion, and the machine connected therewith begins to operate. When pressure is removed from the inner end of the treadle, the weight P, fixed to its outer end or edge, draws back the lever L automatically, so as to release the pulley H from pressure, and said pulley stops rotating, and the machine connected therewith ceases to operate. The weight P moves the lever L promptly when the foot is removed from the treadle, and the weight is cheaper and more reliable than springs, which are easily deranged or broken. A collar, K, like collar I, may be placed between pulley G and the adjacent hanger E, and the arm of lever L and the collars K I be dispensed with.

The pulleys B G may have grooved face portions B' G', respectively, for connection by a round belt, if desired.

I am aware that it is not broadly new to throw two pulleys having a flexible disk between them into gear by means of an elbow-lever connected with a foot-treadle; also, that weighted foot-treadles are not broadly new, and I do not desire to claim such as broadly of my invention.

Having thus fully described my invention, I claim as new and desire to secure by Letters Patent—

1. The stationary shaft C, provided with square ends, in combination with the depending hangers E E, secured to the under side of the table, and provided at their lower ends with the angular open sockets D D, and the bolts F F, for retaining the squared ends of the shaft within the sockets, substantially as set forth.

2. A motion-transmitter consisting of the shaft having its squared ends mounted in the open angular sockets D in the lower ends of the hangers E, and the retaining-bolts F, the stationary shaft also provided with the pulleys G H, between the adjacent faces of which is mounted a flexible disk, and the sleeves I K, on the shaft outside of the pulleys, the former being operated by a forked elbow-lever pivoted to the hanger above the shaft, and the long arm of said lever being in turn connected by a rod, N, to the treadle M, having the weight P on its under rear edge, substantially as set forth.

HENRY GARDNER.

Witnesses:
LAMBERT BEEMOKES,
BENJAMIN F. WOOD.